S. DIXSON.
Seeding-Machines.

No. 158,407. Patented Jan. 5, 1875.

Witnesses.
D. G. Stuart
I. Y. Knight

Inventor.
Stephen Dixson
W. B. Richards &
A. McCallum
Attys

UNITED STATES PATENT OFFICE.

STEPHEN DIXSON, OF ROSEVILLE, ILLINOIS.

IMPROVEMENT IN SEEDING-MACHINES.

Specification forming part of Letters Patent No. 158,407, dated January 5, 1875; application filed July 25, 1874.

*To all whom it may concern:*

Be it known that I, STEPHEN DIXSON, of Roseville, in the county of Warren and State of Illinois, have invented certain new and useful Improvements in Seeding-Machines; and I do hereby declare the following to be a full, clear, and exact description of the invention, such as will enable others skilled in the art to which it pertains to make and use it, reference being had to the accompanying drawings, which form part of this specification.

My invention relates to devices for planting, or dropping and covering, corn or other seed automatically; and the invention consists in a new and improved device consisting of peculiarly-shaped oscillating seed-cup bars, operating within the seed-box by means of suitable mechanism receiving motion from a covering-roller, all as hereinafter more fully set forth.

Figure 1:
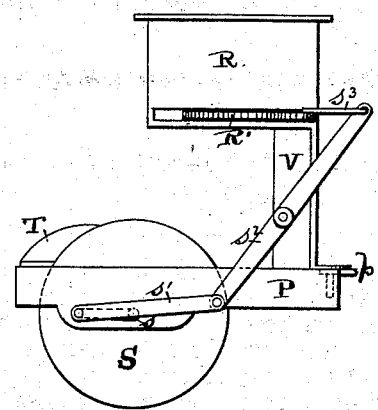
Figure 4:
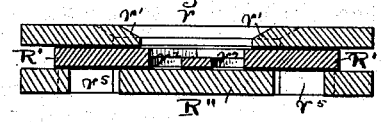
Figure 3:
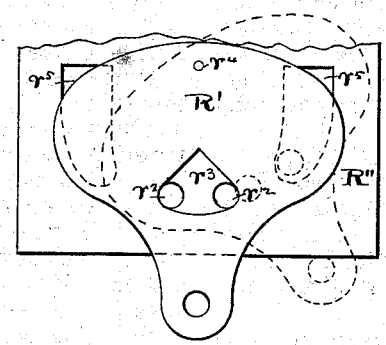
Figure 2:
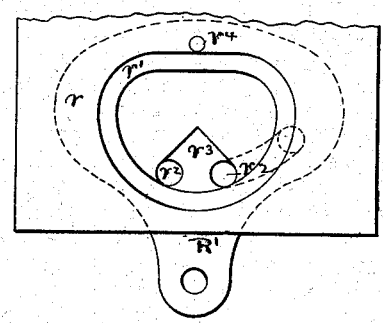

In the accompanying drawings, Figure 1 is a side elevation of my improved seed-dropping machine. Fig. 2 is a top-plan view of the bottom of the seed-box; Fig. 3, a similar view, showing the oscillating seed-cup bar. Fig. 4 is a vertical sectional view of the seed-dropper.

Referring to the parts by letters, R represents the seed-box, the bottom of which is cut with two openings or slots, $r$ $r$, formed with inclined edges $r^1$, as clearly shown by Fig. 4 of the drawings. R' represents one of the oscillating seed-cup bars, having circular holes or slots $r^2$ and a triangular-shaped depression, $r^3$, in which a sufficient quantity to form two or three hills of corn is always held or retained. There are two of these seed-cup bars, one on each side of the seed-box, to the bottom of which they are pivoted, as shown at $r^4$, near their inner ends, their outer ends projecting out through slots in the sides of the box.

The shape of the bars R' is clearly shown by Fig. 3 of the drawings, in which the bottom of the seed-box is removed.

R'' is the top or cover of the hopper or tube, through which the seed passes to the ground. It is provided with slots $r^5$ of the form shown by dotted lines, Fig. 3.

Motion is communicated to the oscillating bars by means of crank $s$ on the ends of the shaft or spindle of the roller S, connecting-rods $s^1$, and lever $s^2$, the upper ends or arms of the latter being connected with the projecting arms of the bars R' by links $s^3$.

The seed-box and roller are secured to a frame, P, which is provided with staples $p$ for the attachment to the frame-work of machines for plowing or otherwise preparing the land for seeding; or it may be attached to machines specially adapted for preparing the land for and the planting of corn, like that invented by me, and for which I obtained Letters Patent of the United States of even date herewith.

T represents scrapers secured to the rear ends of the frame P, their ends projecting inwardly toward the roller S, for the purpose of scraping the soil from the roller and keeping it in proper working order.

The operation of my improved seed-dropper is as follows: The seed in the box R readily falls into the oscillating bars R', the inclined sides of the openings $r$ leading it toward the depression $r^3$, in which it is held while being carried under the bottom of the seed-box. The oscillating motion causes it to settle into the circular slots $r^2$, when it is carried in sufficient quantities under the bottom of the seed-box in the diagonal path shown by dotted lines, Fig. 2, to the openings $r^5$, through which it drops to the ground through the tube V. The lower edges of the inclined openings $r$ of the bottom of the seed-box thus act as cut-offs, permitting only the grain which is contained within the depression $r^3$ to pass under the bottom of the box, and the triangular shape of these depressions $r^3$ aids, with the oscillating movement of the bar, to cause the seed to settle well into the slots $r^2$.

The two oscillating bars operate automatically—as the one is dropping the seed the other is obtaining a fresh supply.

Having thus described my invention, what

I claim as new, and desire to secure by Letters Patent, is—

The seed-box R, having slots $r$, with inclined edges $r^1$, the oscillating seed-cup bars R' R', having slots $r^2$ and depressions $r^3$, and the plate R'', having slots $r^5$, all operating in combination, substantially as and for the purpose specified.

In testimony that I claim the foregoing as my own I affix my signature in presence of two witnesses.

STEPHEN DIXSON.

Witnesses:
W. B. RICHARDS,
J. J. TUNNICLIFF.